US009274300B2

(12) United States Patent
Miller et al.

(10) Patent No.: US 9,274,300 B2
(45) Date of Patent: Mar. 1, 2016

(54) HIGH DENSITY ENCLOSURE FOR OPTICAL MODULES

(71) Applicants: Gary Evan Miller, Holly Springs, NC (US); Otis James Johnston, Raleigh, NC (US); Kevin William Miller, Raleigh, NC (US)

(72) Inventors: Gary Evan Miller, Holly Springs, NC (US); Otis James Johnston, Raleigh, NC (US); Kevin William Miller, Raleigh, NC (US)

(73) Assignee: M2 OPTICS, INC., Holly Springs, NC (US)

(*) Notice: Subject to any disclaimer, the term of this patent is extended or adjusted under 35 U.S.C. 154(b) by 74 days.

(21) Appl. No.: 14/072,528

(22) Filed: Nov. 5, 2013

(65) Prior Publication Data
US 2014/0314385 A1    Oct. 23, 2014

Related U.S. Application Data

(60) Provisional application No. 61/854,402, filed on Apr. 22, 2013.

(51) Int. Cl.
*G02B 6/44* (2006.01)
*G02B 6/38* (2006.01)
*G02B 6/30* (2006.01)

(52) U.S. Cl.
CPC ............. *G02B 6/4452* (2013.01); *G02B 6/30* (2013.01); *G02B 6/3825* (2013.01); *G02B 6/3885* (2013.01); *G02B 6/3897* (2013.01); *G02B 6/444* (2013.01); *G02B 6/4454* (2013.01); *G02B 6/4455* (2013.01)

(58) Field of Classification Search
CPC .. G02B 6/4452; G02B 6/3897; G02B 6/4455; G02B 6/4454; G02B 6/444; G02B 6/3825
USPC ........................................................ 385/135
See application file for complete search history.

(56) References Cited

U.S. PATENT DOCUMENTS

| | | | |
|---|---|---|---|
| 5,363,465 A | 11/1994 | Korkowski et al. | |
| 6,980,725 B1* | 12/2005 | Swieconek | G02B 6/4452 385/135 |
| 7,218,828 B2 | 5/2007 | Feustel et al. | |
| 7,738,757 B1* | 6/2010 | Pakravan | G02B 6/3897 370/351 |
| 7,853,112 B2 | 12/2010 | Zimmel et al. | |
| 7,912,336 B2* | 3/2011 | Zimmel | 385/135 |
| 7,936,962 B2 | 5/2011 | Mudd et al. | |
| 8,180,192 B2* | 5/2012 | Zimmel | 385/135 |
| 8,254,741 B2 | 8/2012 | Imaizumi et al. | |
| 2006/0008231 A1* | 1/2006 | Reagan | G02B 6/3849 385/135 |
| 2007/0196053 A1* | 8/2007 | Kewitsch | 385/74 |
| 2011/0116755 A1* | 5/2011 | Rolston | G02B 6/4452 385/135 |
| 2012/0051707 A1* | 3/2012 | Barnes et al. | 385/135 |

* cited by examiner

*Primary Examiner* — Ryan Lepisto
*Assistant Examiner* — Mary A El Shammaa
(74) *Attorney, Agent, or Firm* — Douglas A. Pinnow

(57) ABSTRACT

Rack mountable equipment enclosures have been developed that contain a multiplicity of fiber optical component such as optical taps, arrayed waveguide gratings (AWGs), optical splitters, and optical switches at a greater component density than has been previously achieved. For example, 192 fiber optical taps can be contained in a standard 19 inch wide equipment enclosure that is only 1 Rack Unit (1.75 inches) high. This high component density is achieved by locating the optical components within a multiplicity of modular containers inside of the equipment enclosure. The components are connected to fiber optic pig-tails that extend beyond the modular containers. These pig-tails are terminated with multi-fiber connectors that are mounted on the front panel of the equipment enclosure. This strategy allows for efficient packing of the modular containers containing optical components in the full volume of the rack space that is available to the equipment enclosure.

20 Claims, 4 Drawing Sheets

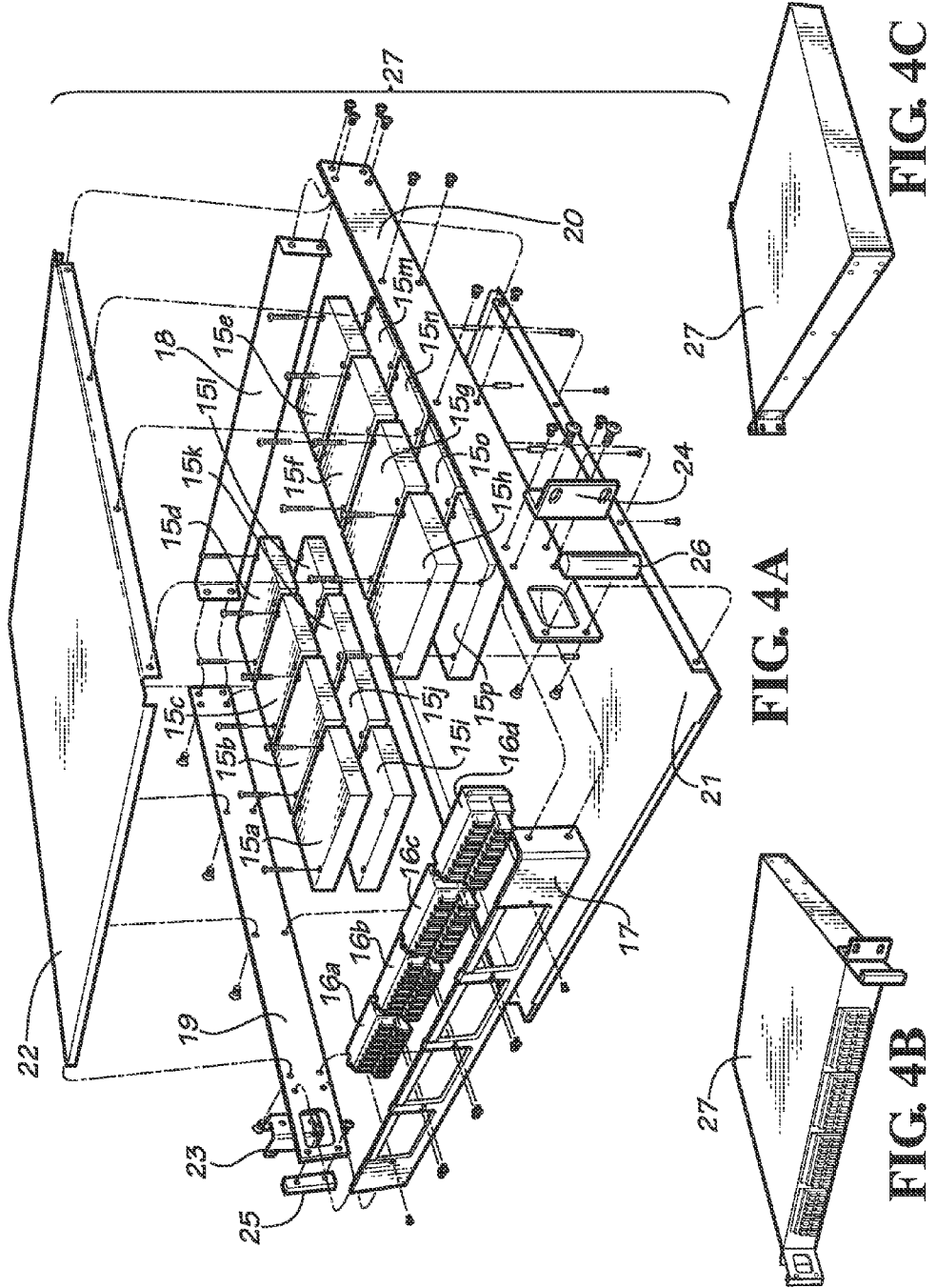

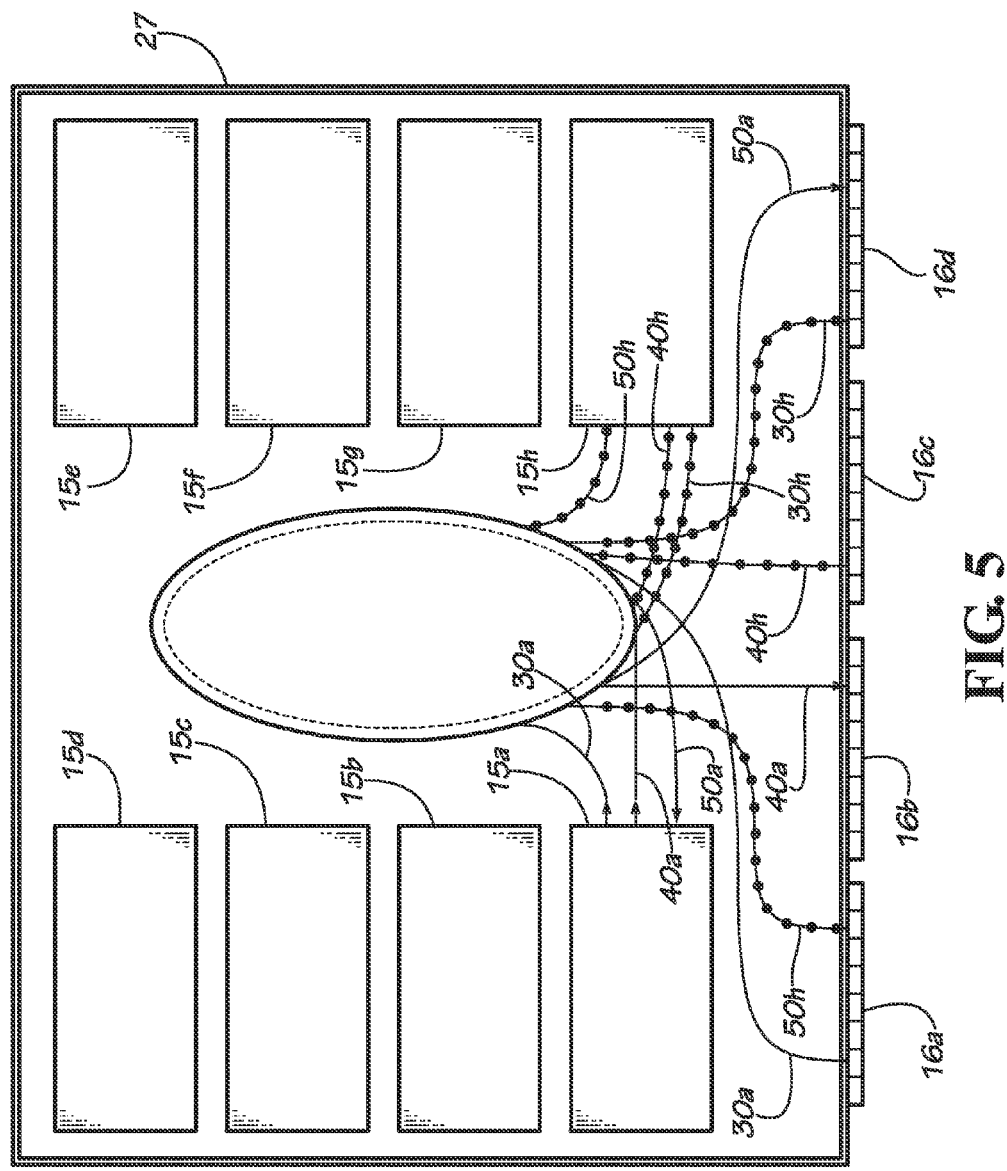

HIGH DENSITY ENCLOSURE FOR OPTICAL MODULES

CROSS-REFERENCES TO RELATED APPLICATIONS

This application claims the benefit of U.S. Provisional Patent Application Ser. No. 61/854,402 filed Apr. 22, 2013, the contents of which are hereby incorporated by reference herein.

TECHNICAL FIELD AND INDUSTRIAL APPLICABILITY OF THE INVENTION

The present invention relates to packaging of fiber optic components (including taps, splitters, arrayed waveguide gratings, and switches) with high packing densities in order to fit a large number of components into an enclosure that will occupy a minimum space in equipment racks that are used in support of various types of fiber optic communication systems.

BACKGROUND OF INVENTION

Terrestrial communications throughout the world has grown to rely heavily on optical fiber communications technology. And there is an increasing flow of signaling information that requires use of multiple optical fibers in communication links from one point to another. The various origination, termination, and relay points for optical fiber distribution systems form huge matrices—much more complicated than, say, a map of the railroads or the electrical power grid infrastructures in the United States and abroad. In fact, some optical fiber links do run along power lines and railroad right-of-ways. But, they also run under seas, across farmers' fields, down city streets, into campuses and within buildings and homes.

Management of complex fiber optic communication systems requires many different types of specialized optical and electronic equipment to ensure that correct signals are continuously being sent and received with minimum interruptions and that any failures are detected and quickly rectified.

At a very basic level, it is necessary to use an optical tap to extract a portion of the optical signal in each fiber within a transmission cable so that its functionality can be monitored. In some cases, monitoring the total optical power level is sufficient. In other cases where multiple optical channels are simultaneously transmitted on a single fiber using wavelength division multiplexing (WDM), it is often necessary to use arrayed waveguide gratings (AWGs) to separate the individual optical channels before they are directed to monitoring equipment. In other cases, optical splitters and optical switches are also employed for monitoring purposes. Due to the large number of optical fibers used in modern optical communication systems, many optical taps, AWGs, splitters and switches are employed. A multiplicity of these components is typically located inside of an equipment enclosure and these enclosures are mounted in racks that fill equipment bays.

Clearly, it is desirable to reduce both the size and expense of the various pieces of equipment required to accomplish the desired monitoring functions. And this has been an ongoing evolutionary process for all types of equipment used in modern fiber optical communication systems.

The present approach for packaging various optical components like optical taps is to pack some manageable number of them into a container called a cassette that has optical connectors on one or more of its narrow sides. (See for example, "AFL Fiber Inside Plant—Xpress Fiber Management (XFM) Optical Cassettes"—www.AFLglobal.com.) These cassettes are, in turn, closely packed side-by-side into an equipment enclosure that is mounted in an equipment rack such that most or all of the optical connectors on the cassettes face outward for convenient access. (See "Fiber Enclosures: Rack-Mount Enclosure Selection Guide" by Leviton Network Solutions, 2222-222$^{nd}$ Street, S.E., Bothell, Wash. 98021—www.levition.com.) A 19 inch wide equipment enclosure would typically hold ten or twelve side-by-side cassettes.

The LGX equipment design was originally developed by Lucent Technologies (now known as Alcatel-Lucent) but is now broadly used as a defacto standard in the fiber optical communications industry. A number of well know companies including ADC Telecommunications (See "LGX-Compatible (LSX) Preteminated Termination/Splice Panel With Pigtails—User Manual 2009" ADC Telecommunications, Inc, P.O. Box, 1101, Minneapolis, Minn. 55440-1101), Tyco Electronics, and Leviton (See "Fiber Enclosures: Rack-Mount Enclosure Selection Guide" by Leviton Network Solutions, 2222-222$^{nd}$ Street, S.E., Bothell, Wash. 98021—www.leviton.com) are suppliers of the LGX racks, equipment enclosures, and cassettes. Some companies, like Net Optics and MiMetrix Technologies use proprietary equipment enclosure designs for optical taps, but their overall topology is similar to the LGX standard with cassettes that fit into closely spaced openings on the front panel of a rack mounted equipment enclosure. For example, one specific design offered by Net Optics ("Flex Tap Data Sheet" by Net Optics, 5303 Betsy Ross Drive; Santa Clara, Calif. 95054—www.netoptics.com) has a total of 24 side-by-side cassettes each containing two optical taps for a total of 48 taps that are terminated with optical connectors that fits into a standard 19 inch wide rack mounted equipment enclosure that is 1 RU high. (Note: 1 RU corresponds to one unit of rack space that is 1.75 inches high. Typical equipment racks have a total height of 42 RUs or 73.5 inches.) The packaging of optical taps provided by MiMetrix Technologies ("Optical Tap Data Sheet" by MiMetrix Technologies, 11160 C1 South Lake Drive, Suite 190; Reston, Va. 20191—www.mimetrix.com) has a higher density because their design includes twelve optical taps each inside of 8 cassettes whose optical connectors face outward on the front of an equipment enclosure that also has a height of 1 RU. The higher density of optical taps offered by MiMetrix Technologies, 96 taps per 1 RU (8×12=96), is generally considered a more desirable feature than the lower density (48 taps per 1 RU) offered by Net Optics.

Finally, it would be advantageous if the density of various types of optical components like optical taps, AWGs and splitters could be further increased so that less space would be consumed in equipment bays. This is especially relevant for any equipment used in remote monitoring stations because space there is particularly expensive to acquire and maintain.

Also see U.S. Pat. Nos. 5,363,465, 7,218,828, 7,853,112, 7,912,336, 7,939,962, 8,180,192, 8,254,741, and U.S. Patent Application Publication No. 2010/0142907.

BRIEF SUMMARY OF THE INVENTION

The purpose of this disclosure is to describe an entirely new strategy for increasing the packaging density of various optical components in an equipment enclosure. As a starting point, it is recognized that the packaging density using the LGX enclosures, or any of the existing proprietary enclosures that are similar, is limited by the number of modular containers that can be packed closely together along the front panel of a rack mounted enclosure with their integral optical connectors facing outward. Since the maximum depth dimension of a typical modular container is only a fraction of the depth permitted by an equipment rack, there is normally a considerable amount of empty space behind the modular containers that is not utilized. For example, an LGX modular container has a depth of approximately 5 to 10 inches (127 to 254 mm) while the depth of the equipment rack may be 20 inches or more. (Standard equipment racks are 19 inches wide and other non-standard racks are 21 and 23 inches wide, but there is no standard for their depth. However, the most commonly used depths are 23.6 inches, 31.5 inches and 39.4 inches, corresponding to 60, 80, and 100 cm respectively.) If this empty space could be beneficially occupied by additional optical components, then the component density (per RU) could be increased beyond the limitations of the present equipment enclosure designs.

This strategy can be achieved by filling the entire 3-dimension rack space allowed per RU with modular containers that do not have optical connectors mounted on their outer surfaces. Rather the optical components in the modular containers are connected to multi-fiber ribbon cables that pass directly through small holes in the outer walls of the modular containers and continue on to terminate with optical connectors mounted on the front panel of the equipment enclosure.

Basically, the optical component density using the LGX standard and related proprietary equipment enclosures designs is limited to a 1-dimensional array of cassettes that must be so positioned to provide access to their surface mounted connectors. Any remaining space behind these cassettes in the equipment rack can not be utilized. In contrast, use of optical fiber ribbon cables as "pig-tails" from the modular containers to the front panel allow these containers to located anywhere in the 3-dimension volume of the rack space that is available for the equipment enclosure.

The new design employing fiber ribbon cables to connect optical components to the front panel of an equipment enclosure has been designated HDP for High Density Platform. As an example of its very high density performance, 192 optical taps can be contained in a single HDP enclosure that is only 1 RU (1.75 inches) high and 20 inches deep. This represents a two-fold improvement in density over MiMetrix Technologies unit, discussed above and a four-fold improvement in density over the unit offered by Net Optics. Similar enclosures with depths in the range of 19 to 22 would have similar properties. Another example is an equipment enclosure also 1 RU high with a nominal 13 inch depth (in the range of 12 to 14 inches) that is used for applications where the rack depth is limited by physical constraints and a smaller quantity of splitters is acceptable. Typically, this 13 inch depth enclosure houses one half the number of splitters of the 20 inch depth unit. There is also a nominal 10 inch depth equipment enclosure, ranging from 9 to 11 inches, that is specifically for PON (passive optical network) applications where the enclosure is placed in PON distribution cabinets or in multiple dwelling units (with more restrictive depths than typical equipment racks) for distribution to individual clients. These would normally house a single or multiple(s) of 1×16, 1×32 or 1×64 planar lightwave circuit (PLC) splitters. (See "Planar lightwave circuit devices for optical communications present and future" by Hiroshi Takahashi et al, Proceedings of the SPIE, Vol. 5246 (2003) pp 520-530.) The PON enclosures are designed to be rack mounted or wall mounted.

BRIEF DESCRIPTION OF THE DRAWINGS

FIG. 1 shows a planar lightwave circuit (PLC) for a single 1×2 optical splitter assembled with one input fiber and two exiting fibers. When used as an optical tap, one of the two exiting fibers is designated as the output fiber and the other is designated as the tap fiber.

FIG. 2 shows a modular container that holds four optical taps similar to the one shown in FIG. 1. The input and output fibers from theses taps are organized within the container so that the four input fibers are incorporated into a first optical fiber ribbon cable, the four output fibers are incorporated into a second fiber ribbon cable, and the four tap fibers are incorporated into a third fiber ribbon cable. The three fiber ribbon cables pass through holes in the wall of the modular container and are secured in place at the wall penetrations with a bonding agent. These cables are often referred to as "pig-tails" because they are quite flexible and extend a considerable distance from the module before they are terminated with a multi-fiber connector such as a standard MTP or MPO connector. (See, for example, "The MTP Connector, AEN 90, Revision 1-2002" by Corning Cable Systems, 800 17ht Street, Hickory, N.C. 28603-0489 and "Optical fiber connector" Wikipedia.)

FIG. 3 is another example of a modular container that holds a 1×32 optical fiber splitter. In this case, there is a single input fiber and four output ribbon cables that contain 8 fiber each, for a total of 32 output fibers. This is a good example where both single fiber cable and multi-fiber cables are used.

FIGS. 4A, B, and C. FIG. 4A, FIG. 4B, and FIG. 4C show an exploded view, front view and back assembled views of a HDP equipment enclosure, respectively, that holds 16 modular containers similar to the ones shown in FIG. 2 and/or FIG. 3. The outside dimensions of most modular containers are approximately 3 inches by 5 inches by ½ inch which is a convenient size for placing into the equipment enclosure that can be rack mounted. If each modular container held 8 optical taps and all of the optical fiber ribbon cables terminated on the front panel using 8 fibers in a multi-fiber connector such as MTP or MPO connector, this equipment enclosure would contain a total of 128 optical taps (16×8=128). The density of optical taps could be increased to 192 by increasing the number of taps in each modular container to 12 and employing ribbon cables and associated MTP or MPO connectors having 12 fibers each. This represents a practical arrangement.

FIG. 5. FIG. 5 shows how some of the optical fiber ribbon cables are positioned within the HDP equipment enclosure. The reason that these particular ribbon cables follow an indirect loop path is explained below in the Detailed Description of Preferred Embodiments.

DETAILED DESCRIPTION OF THE INVENTION

With reference to the attached drawings, embodiments of the present invention will be described below.

Figure 1:
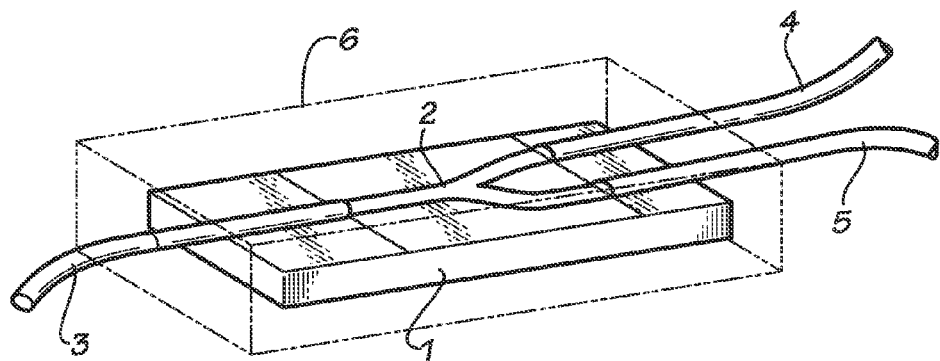
FIG. 1.

FIG. 1 shows the basic construction of a typical optical tap made using planar lightwave circuit (PLC) technology. The optical circuit is formed on substrate 1 that is a polished wafer of pure fused silica or a wafer of semiconductor silicon covered on its top side with the deposition of a relatively thick layer of pure silicon dioxide ($SiO_2$) that is approximately 20 microns thick. On the very top of substrate 1 there is a second deposited layer of doped silica glass that is approximately 7 microns thick that has been patterned using techniques similar to semiconductor processing. The refractive index of this deposited layer is approximately 0.3% greater than that of pure fused silica. In the case of the optical tap, after processing, the remaining doped layer of silica glass has been reduced to a relatively simple "Y" shape 2 as shown in FIG. 1. This serves as a planar optical waveguide that divides the optical beam coming out of the input fiber 3 into two parts that are directed to exiting fibers 4 and 5. In most practical applications, all of these fibers are single-mode fibers. Depending on the specific geometry of the "Y" shape 2, the splitting ratio may be adjusted to achieve a splitting ratio of 50%-50% or some other values, like 90%-10% or 80%-20%. Normally, the output fiber 4 is the one that receives the greatest optical power after splitting and the tap fiber is the one that receives the least optical power. In the special case of a 50%-50% split in power, the designation of the output and tap fibers is arbitrary. The left and right side of substrate 1 usually includes "V" grooved channels (not shown) that help to align the centers of the input and exiting fibers to the center line of the planar "Y" shaped optical waveguide 2. The final step in making an optical tap like the one shown in FIG. 1 is usually to cover the substrate 1 and optical fibers 3, 4, and 5 with second thin wafer of pure fused silica (not shown) that is bonded in place using transparent optical cement that is matched in refractive index to that of pure fused silica. For extra mechanical strength and durability, the optical tap is usually enclosed in a metal package 6 with open ends or holes to pass the optical fibers. This optical tap assembly is then an example of one of the various optical components that can be included either singly or in multiplicity inside of a modular container, as shown in the next figure.

Figure 2:
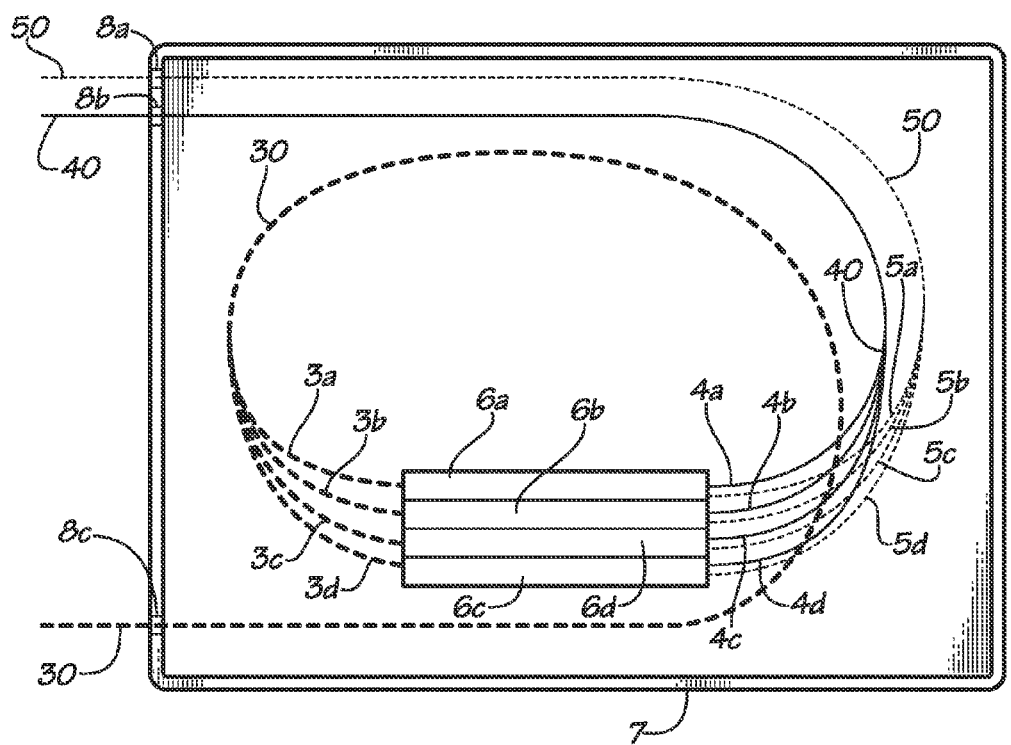
FIG. 2.

FIG. 2. shows an example of a modular container 7 that encloses four optical taps 6a, 6b, 6c, and 6d similar to the one shown in FIG. 1. Each optical tap is secured in place on the inner surface of a modular container 7 with a boding agent such as a low stress epoxy cement to prevent undesired motion. The four input fibers 3a, 3b, 3c and 3d to these taps are "fanned out" from a multi-fiber ribbon cable (pig-tail) 30 that loops around inside of the modular container before exiting the container through hole 8c. Similarly, output fibers 4a, 4b, 4c, and 4d and tap fibers 5a, 5b, 5c, and 5d are brought together in multi-fiber ribbon cables (pig-tails) 40 and 50, respectively, and exit the modular container through holes 8b and 8c. The loop shaped paths for the fibers and ribbon cables inside of modular container 7 are necessary to avoid bend radii of less that approximately 1 inch in order to prevent fiber breakage due to the well known effect of static stress fatigue. Often, the fiber cables are secured in their loop shapes using tie-wraps or some other convenient mechanism. Typically, the fiber ribbon cables are also secured in place at the holes 8a, 8b, and 8c by using a bonding agent such as a low stress epoxy cement or silicone rubber cement to fasten them to the modular container wall where the holes are located.

While the modular container shown in FIG. 2 contains 4 optical taps, it is practical to include additional layers of optical taps so that 8 optical taps (2 layers) or 12 optical taps (3 layers) can fit into a single modular container. Typical outside dimensions for such a modular container are approximately ½ inches by 3 inches by 5 inches. These modular containers typically have a rectangular box shape as shown in FIG. 2 with removable covers. These modular containers are normally made from a strong plastic or metal for durability.

Figure 3:
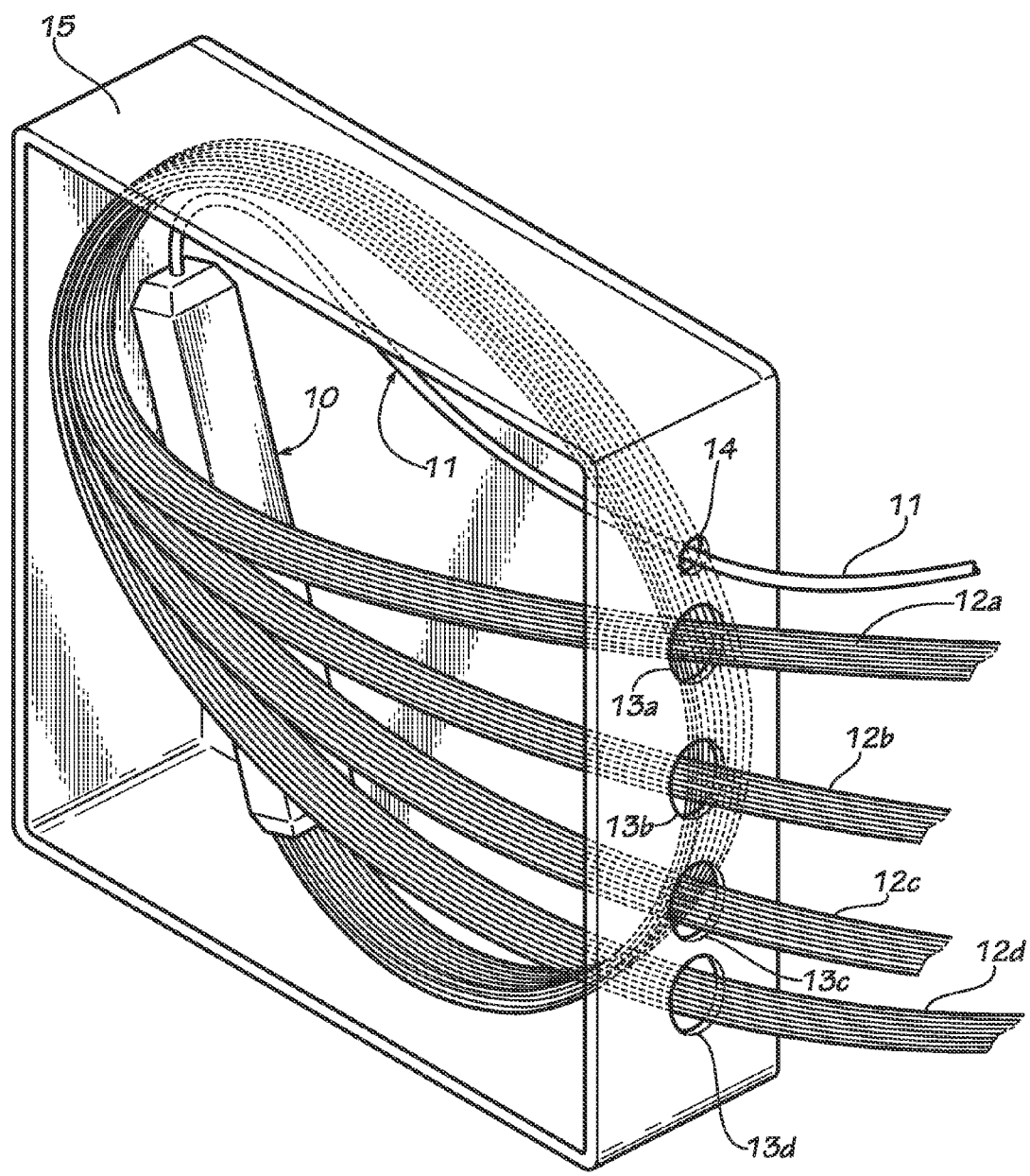
FIG. 3.

FIG. 3 is another example of a modular container. In this instance, the modular container 15, that typically has a rectangular cross-section of approximately 3 inches by 5 inches, houses a 1×32 PLC optical splitter 10. There is a single input fiber 11 and 32 output fibers that are organized in four ribbon cables 12a, 12b, 12c, and 12d containing 8 optical fibers each that pass through the wall of the modular container at holes 13a, 13b, 13c, and 13d, respectively. There is also a smaller hole 14 in the container wall to pass the single input fiber 11. The splitter and optical fiber cables are secured in place using techniques described above for the optical tap.

FIG. 4A shows an exploded view of an HDP equipment enclosure 27 that reveals 16 modular containers, 15a through 15p, that are enclosed within. Typical outside dimensions for these modular containers are approximately ½ inches by 3 inches by 5 inches so that they can fit inside of an equipment enclosure 27 that is rack mountable. There is a multiplicity of 16 MTP or MPO optical connectors on each of the four connector blocks 16a, 16b, 16c, and 16d that are inserted in to the front panel 17 of the equipment enclosure. The equipment enclosure is formed by securing the front panel 17 and the back panel 18 to the left and right side plates 19 and 20, respectively, using screws. The equipment enclosure is completed by securing its bottom plate 21 and top plate 22 in place with screws. The equipment enclosure also has adjustable brackets 23 and 24 that serve to mount the enclosure into equipment racks having widths of 19 inches, 21, inches or 23 inches. Convenient handles 25 and 26 are also secured in place using screws. These handles assist in transporting the equipment enclosure and in inserting it into an equipment rack. Normally, equipment enclosures are made from metal, although other durable materials like fiber glass and boron-graphite fiber composites could also be used if desired. FIGS. 4B and 4C show front and back assembled views, respectively, of the HDP equipment enclosure.

FIG. 5 shows the routing path for the two input fiber ribbon cables (pig-tails) 30a and 30h associated with modular containers 15a and 15h, the two output fiber ribbon cables (pig-tails) 40a and 40h, and the two tap fiber ribbon cables (pig-tails) 50a and 50h also associated with modular enclosures 15a and 15h. As these ribbon cables exit their respective modular containers they are secured in a loop before being terminated on the connector blocks 16a, 16b, 16c, and 16d that are mounted on the front panel of the equipment enclosure.

The reason that these particular ribbon cables follow an indirect loop path to the front panel is because it is cost effective to make all of the ribbon cables the same length (approximately 30 inches) and to pre-terminate them with MTP or MPO optical connectors that can be inserted directly into the front panel of the HDP equipment enclosure. A looping path has been determined to be the preferred way to position fiber ribbon cables coming out of the component containers that are located near to the front panel so as to minimize the mechanical bending induced stresses in the individual fibers. Such a loop is not required in the ribbon cables coming out of component containers that are located further from the front panel. Rather, a more direct path can be used with these ribbon cables passing directly down the central channel between the two rows of equipment modules. In all cases, it is important that any bend radii associated with the paths of the ribbon cables be relatively large (greater than about 1 inch) to avoid fiber breakage due to the well known mechanism of static stress fatigue.

It is advantageous if the shape of the modular containers has sufficient symmetry that these modules can be located on either the left-hand or right-hand side of the equipment enclosure with their ribbon cable exit holes directly facing the channel between the two rows of modular containers. This strategy avoids the need to inventory two types of modular containers that are specifically left-handed and right-handed.

While the above drawings provide representative examples of specific embodiments of the inventive equipment enclosure, there are numerous variations on the types of optical components contained within these equipment enclosures, the sizes and number of modular containers and the types of optical fiber cables and optical connectors that can be used.

What is claimed is:

1. An equipment enclosure used in indoor equipment bays that holds in place within its interior a multiplicity of box shaped modular containers with outside dimensions of approximately 3 inches by 5 inches by ½ inch that are organized in rows and columns and that may be stacked in multiple layers to efficiently fill the available space such that:

(a) the optical components in one or more of the modular containers are any combination of optical taps, arrayed waveguide gratings (AWGs), optical splitters, and/or optical switches, (b) the above optical components are connected with single fiber cable or multi-fiber ribbon cable pig-tails that extend beyond the individual modular containers and terminate with single-fiber or multi-fiber optical connectors that are secured on the front panel of the equipment enclosure, (c) at least two rows of module containers run between the front and rear panels of the equipment enclosure in which one of the at least two rows of modular containers is located on the right-hand side of the equipment enclosure and another row is located on the left-hand side of the equipment enclosure, and (d) there is sufficient space between adjacent rows of modular containers to serve as a channel(s) to contain and guide the multi-fiber ribbon pig-tails emanating from the modular containers so that the pig-tails can be terminated with optical connectors on the front panel of the equipment enclosure with minimum bend radii of at least one inch for the entire lengths of the ribbon pigtails.

2. An equipment enclosure as in claim 1 which has a width, including the width of any mounting brackets, that can fit into and be secured in a standard 19 inch wide equipment rack.

3. An equipment enclosure as in claim 2 that fits into a space that is 1 RU (1.75 inches) high.

4. An equipment enclosure as in claim 2 that fits into a space that is an integer number of RUs (rack units) high.

5. An equipment enclosure as in claim 1 which has a width, including the width of any mounting brackets, that can fit into and be secured in a 21 inch wide equipment rack.

6. An equipment enclosure as in claim 5 that fits into a space that is 1 RU (1.75 inches) high.

7. An equipment enclosure as in claim 5 that fits into a space that is an integer number of RUs (rack units) high.

8. An equipment enclosure as in claim 1 which has a width, including the width of any mounting brackets, that can fit into and be secured in a 23 inch wide equipment rack.

9. An equipment enclosure as in claim 8 that fits into a space that is 1 RU (1.75 inches) high.

10. An equipment enclosure as in claim 8 that fits into a space that is an integer number of RUs (rack units) high.

11. An equipment enclosure as in claim 1 that has different sizes of removable rack mounting brackets that can be selected so that the equipment enclosure can fit into equipment racks that are either 19 inches, 21 inches or 23 inches wide.

12. An equipment enclosure as in claim 1 in which the rows of modular containers are stacked two or more modules high.

13. An equipment enclosure as in claim 1 having a depth in the range of 19 to 22 inches.

14. An equipment enclosure as in claim 1 having a depth in the range of 12 to 14 inches.

15. An equipment enclosure as in claim 1 having a depth in the range of 9 to 11 inches.

16. An equipment enclosure as in claim 1 having modular containers that are made out of plastic.

17. An equipment enclosure as in claim 1 having modular containers that are made out of metal.

18. An equipment enclosure as in claim 1 in which the shape of the modular containers has sufficient symmetry that these modules can be located on either the right-hand or left-hand side of the equipment enclosure with their ribbon cable exit holes directly facing the channel between the two rows of modular containers.

19. An equipment enclosure as in claim 1 in which the optical fiber connectors mounted on the front panel are single-mode fiber connectors compatible with the MTP or MPO types.

20. An equipment enclosure as in claim 1 in which all of the single fiber cable or multi-fiber ribbon cable pig-tails extend beyond the individual modular containers for approximately 30 inches and terminate with single-fiber or multi-fiber optical connectors that are secured on the front panel of the equipment enclosure.

\* \* \* \* \*